United States Patent
Kobayashi et al.

(10) Patent No.: US 10,597,336 B2
(45) Date of Patent: Mar. 24, 2020

(54) POROUS CERAMIC STRUCTURE

(71) Applicant: NGK Insulators, Ltd., Nagoya (JP)

(72) Inventors: Hiroharu Kobayashi, Kasugai (JP); Takahiro Tomita, Chita (JP); Akinobu Oribe, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/869,554

(22) Filed: Jan. 12, 2018

(65) Prior Publication Data

US 2018/0141872 A1 May 24, 2018

Related U.S. Application Data (63) Continuation of application No. PCT/JP2016/066506, filed on Jun. 2, 2016.

(30) Foreign Application Priority Data

Jul. 16, 2015 (JP) .................................. 2015-141897
Dec. 2, 2015 (JP) .................................. 2015-235495

(51) Int. Cl.
*C04B 38/00* (2006.01)
*B28B 11/14* (2006.01)
(Continued)

(52) U.S. Cl.
CPC .......... *C04B 38/0074* (2013.01); *B28B 11/14* (2013.01); *B28B 11/145* (2013.01); *C04B 35/48* (2013.01); *C04B 35/486* (2013.01); *C04B 35/6261* (2013.01); *C04B 35/6342* (2013.01); *C04B 38/009* (2013.01); *C04B 38/0054* (2013.01); *C04B 38/067* (2013.01); *C04B 38/085* (2013.01); *C04B 41/83* (2013.01); *C04B 38/065* (2013.01); *C04B 2103/42* (2013.01);
(Continued)

(58) Field of Classification Search
None
See application file for complete search history.

(56) References Cited

U.S. PATENT DOCUMENTS 5,618,765 A * 4/1997 Takeuchi ........... B01D 39/2075
501/152
2007/0130897 A1* 6/2007 Sakaguchi ......... B01D 46/0001
55/523
(Continued)

FOREIGN PATENT DOCUMENTS

JP 05-309638 A1 11/1993
JP 07-164417 A1 6/1995
(Continued)

OTHER PUBLICATIONS

International Search Report and Written Opinion (Application No. PCT/JP2016/066506) dated Aug. 9, 2016.
(Continued)

*Primary Examiner* — Ronak C Patel
(74) *Attorney, Agent, or Firm* — Burr & Brown, PLLC (57) ABSTRACT

A porous ceramic structure has a porosity of 20% to 99%, and includes one principal surface and another principal surface opposite to the one principal surface. At least one cut is formed from the one principal surface toward the other principal surface. An aspect ratio of a divided portion divided by the cut is greater than or equal to 3.

5 Claims, 8 Drawing Sheets

(51) Int. Cl.
*C04B 38/08* (2006.01)
*C04B 35/48* (2006.01)
*C04B 41/83* (2006.01)
*C04B 35/486* (2006.01)
*C04B 35/626* (2006.01)
*C04B 35/634* (2006.01)
*C04B 38/06* (2006.01)
*C04B 103/42* (2006.01)
*C04B 111/00* (2006.01)

(52) U.S. Cl.
CPC . *C04B 2111/00465* (2013.01); *C04B 2201/32* (2013.01); *C04B 2235/3225* (2013.01); *C04B 2235/6025* (2013.01); *C04B 2235/6567* (2013.01); *C04B 2235/77* (2013.01); *C04B 2235/9607* (2013.01); *C04B 2237/348* (2013.01)

(56) References Cited

U.S. PATENT DOCUMENTS

| 2012/0009412 A1 | 1/2012 | Iwai et al. |
| 2015/0104626 A1* | 4/2015 | Tomita ................. C09D 1/00 428/213 |

FOREIGN PATENT DOCUMENTS

| JP | 11-216713 A1 | 8/1999 |
| JP | 2000-202819 A1 | 7/2000 |
| JP | 2002-176119 A1 | 6/2002 |
| JP | 2004-010903 A1 | 1/2004 |
| JP | 2006-173368 A1 | 6/2006 |
| JP | 2010-064945 A1 | 3/2010 |
| JP | 2010-155946 A1 | 7/2010 |

OTHER PUBLICATIONS

Japanese Office Action (Application No. 2017-506416) dated Apr. 27, 2017 (with English translation).

* cited by examiner

POROUS CERAMIC STRUCTURE

CROSS-REFERENCE TO RELATED APPLICATION

This application is a Continuation of International Application No. PCT/JP2016/066506 filed on Jun. 2, 2016, which is based upon and claims the benefit of priority from Japanese Patent Applications No. 2015-141897 filed on Jul. 16, 2015 and No. 2015-235495 filed on Dec. 2, 2015, the contents all of which are incorporated herein by reference.

BACKGROUND OF THE INVENTION

Field of the Invention

The present invention relates to a porous ceramic structure, and more particularly relates to a porous ceramic structure suitable for achieving a reduction in thermal conductivity of a component containing the porous ceramic structure.

Background Art

As a filler that is filled in a heat insulating material or a film, compositions and hollow particles and the like have been described in Japanese Laid-Open Patent Publication No. 2010-155946, Japanese Laid-Open Patent Publication No. 2004-010903, and Japanese Laid-Open Patent Publication No. 2010-064945.

Japanese Laid-Open Patent Publication No. 2010-155946 describes a curable organopolysiloxane composition, which is capable of forming a porous organopolysiloxane cured product having low thermal conductivity.

Japanese Laid-Open Patent Publication No. 2004-010903 describes the formation of a film having low thermal conductivity, by using a coating material in which hollow particles with low thermal conductivity are used.

Japanese Laid-Open Patent Publication No. 2010-064945 discloses a method in which additive particles are adsorbed on surfaces of base particles by an electrostatic interaction, thereby producing nanocoated composite particles, and further manufacturing a composite material through an ordinary powder metallurgy process by use of the composite particles.

SUMMARY OF THE INVENTION

With the technology described in Japanese Laid-Open Patent Publication No. 2010-155946 and Japanese Laid-Open Patent Publication No. 2004-010903, the reduction in thermal conductivity is insufficient. With the technology described in Japanese Laid-Open Patent Publication No. 2010-064945, since it is intended to manufacture a composite material by powder metallurgy, it is kept in mind that fine particles with a particle diameter on the order of nanometers (nm) are coated on the base particles. Therefore, the distance between the base particles becomes short, and in this case as well, the reduction in thermal conductivity is insufficient.

If the particles added to the adhesive are small, it is difficult to uniformly disperse the particles in the adhesive. Further, since it is necessary to fire an adhesive to which particles have been added in advance to form a bulk body, and thereafter place the adhesive on a base material (an object to which the bulk body is adhered), for example, it becomes difficult to place the bulk body in a partial area of the base material, and it is difficult to place the bulk body along a complex shape.

The present invention has been made in consideration of the aforementioned problems, and has the object of providing a porous ceramic structure, in which it is possible to achieve low thermal conductivity, together with installing the porous ceramic structure directly on an object using an adhesive or the like, and further, it is possible to facilitate installation of a bulk body.

[1] A porous ceramic structure according to the present invention has a porosity of 20% to 99%, and comprises one principal surface and another principal surface opposite to the one principal surface. At least one cut is formed from the one principal surface toward the other principal surface. An aspect ratio of a portion divided by the cut is greater than or equal to 3.

[2] In the present invention, preferably, a relationship $1/10 \leq ha/ta \leq 9/10$ is satisfied where ha is a depth of the cut and ta is a thickness of the porous ceramic structure.

[3] In the present invention, a minimum length (Lb) of the porous ceramic structure preferably is less than or equal to 500 μm.

[4] In the present invention, an average pore diameter of the porous ceramic structure preferably is less than or equal to 500 nm.

[5] In the present invention, a thermal conductivity of the porous ceramic structure preferably is less than or equal to 1 W/mK.

[6] In the present invention, preferably, the porous ceramic structure has a structure in which fine grains are connected in three dimensions, and a grain diameter of the fine grains is 1 nm to 5 μm.

[7] A porous ceramic structure according to the present invention may be disposed on a sheet.

Owing to the porous ceramic structure according to the present invention, it is possible to achieve a low thermal conductivity, together with installing the porous ceramic structure directly on an object using an adhesive or the like, and further, it is possible to facilitate installation of a bulk body.

BRIEF DESCRIPTION OF THE DRAWINGS

FIG. 6B is a cross-sectional view with partial omission showing a state in which the plurality of divided pieces are placed along a surface of the object having an irregular shape (warped or the like), a curved surface, or the like.

DESCRIPTION OF THE PREFERRED EMBODIMENTS

An example of a porous ceramic structure according to the present invention will be described below with reference to FIGS. 1A to 8B. In the present specification, the tilde symbol "~" which indicates a numerical range is used with the implication that the numerical values written before and after the tilde symbol are included therein as a lower limit value and an upper limit value of the numerical range.

Figure 1A:
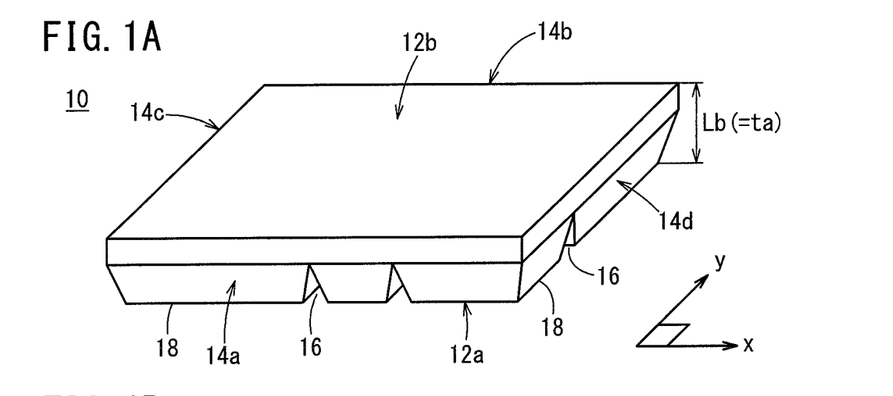
FIG. 1A is a perspective view showing an example in which a porous ceramic structure is arranged such that one principal surface thereof faces downward.
Figure 1B:
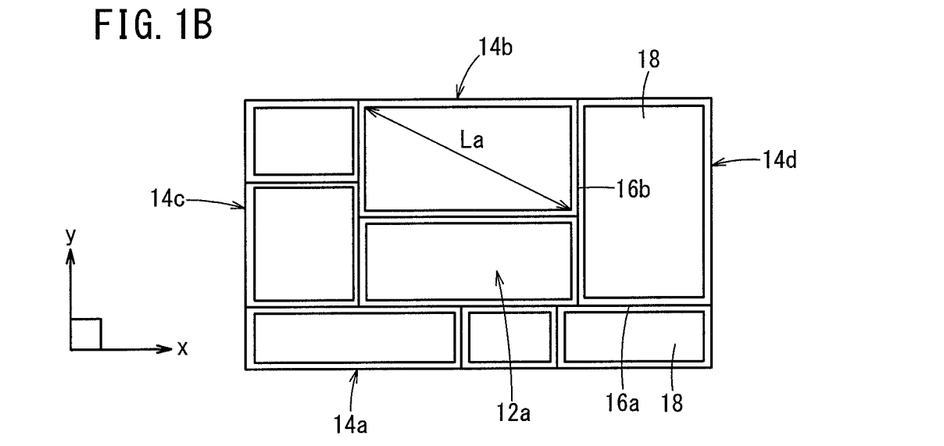
FIG. 1B is a plan view of the porous ceramic structure as viewed from the one principal surface.
Figure 4A:
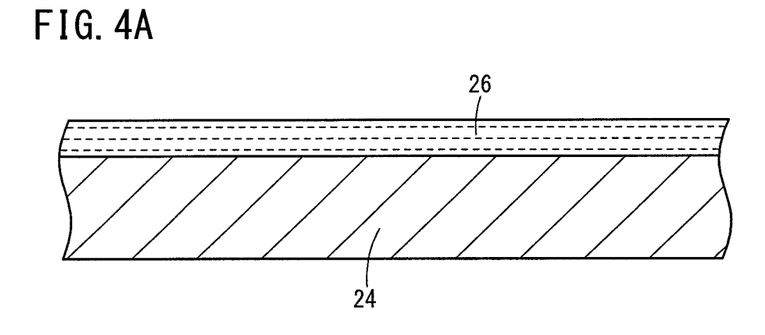
FIG. 4A is a process diagram showing a state in which an adhesive is coated on a base material (an object to which the bulk body is adhered)

As shown for example in FIGS. 1A and 1B, a porous ceramic structure 10 according to the present embodiment is of a three-dimensional shape, having one principal surface 12a, another principal surface 12b opposite to the one principal surface 12a, and a plurality of side surfaces (for example, four side surfaces 14a to 14d). Concerning the shape of the porous ceramic structure 10, at least a planar shape as viewed from the upper surface thereof is a shape along the planar shape of an installation area on a base material (i.e., an object 24 to which a bulk body 22 is applied as shown in FIG. 4A or the like). In FIG. 1A, for an easy explanation, the porous ceramic structure 10 has a rectangular parallelepiped shape for convenience.

The porous ceramic structure 10 has at least one cut 16 from the one principal surface 12a toward the other principal surface 12b. As shown in FIG. 1A, one or more cuts 16 may be formed in one direction (e.g., x-direction). Further, one or more cuts 16 may be formed in another direction different from the one direction (e.g., the direction orthogonal to the one direction: y-direction).

Figure 1C:
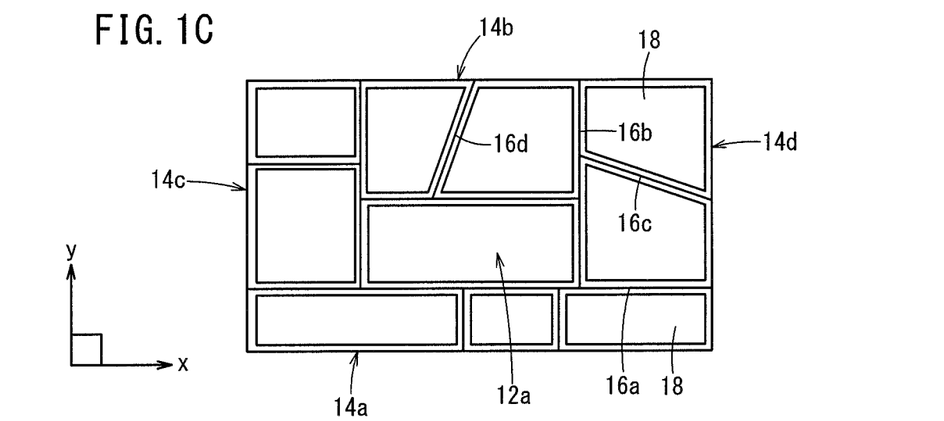
FIG. 1C is a plan view showing another example.

As shown in FIG. 1B, for example, as a cut 16a and the like, the cuts 16 may be formed to extend linearly from one side surface (e.g., the side surface 14a or the side surface 14c) to another side surface opposite to the one side surface (e.g., the side surface 14b or the side surface 14d), or the cuts 16 may be formed to extend halfway, for example, as a cut 16b and the like. As shown in FIG. 10, the cuts 16 may be formed along the side surfaces (e.g., the side surface 14a or the side surface 14c) as the cuts 16a, 16b and the like, in the x-direction or y-direction, or the cuts 16 may be formed obliquely to the side surfaces (e.g., the side surface 14b or the side surface 14d) as the cuts 16c, 16d.

As shown in FIG. 1B, the porous ceramic structure 10 preferably have an aspect ratio of a divided portion divided by the cuts 16 (hereinafter referred to as a divided portion 18) greater than or equal to 3. More preferably, the aspect ratio is greater than or equal to 5, even more preferably, is greater than or equal to 7, and still even more preferably, is greater than or equal to 15.

In this case, the aspect ratio is defined by the maximum length La divided by the minimum length Lb, or La/Lb. As shown in FIG. 1B, the maximum length La refers to a maximum length on a widest surface (in this case, a surface belonging to the one principal surface 12a) from among the plurality of surfaces constituting the divided portion 18. Assuming that the widest surface is a square, a rectangle, a trapezoid, a parallelogram, or a polygon (pentagon, hexagon, etc.), the maximum length La corresponds to the length of a longest diagonal line, whereas if the widest surface is circular, the maximum length La corresponds to the length of a diameter, and if the widest surface is an ellipse, the maximum length La corresponds to the length of a major axis of the ellipse. On the other hand, as shown in FIG. 1A, the minimum length Lb refers to a thickness of the thinnest portion of the divided portion 18, i.e., the thickness ta of the porous ceramic structure 10.

The thickness ta preferably is less than or equal to 500 μm, more preferably, is 50~500 μm, even more preferably, is 55~400 μm, and particularly preferably, is 60~300 μm.

Figure 2:
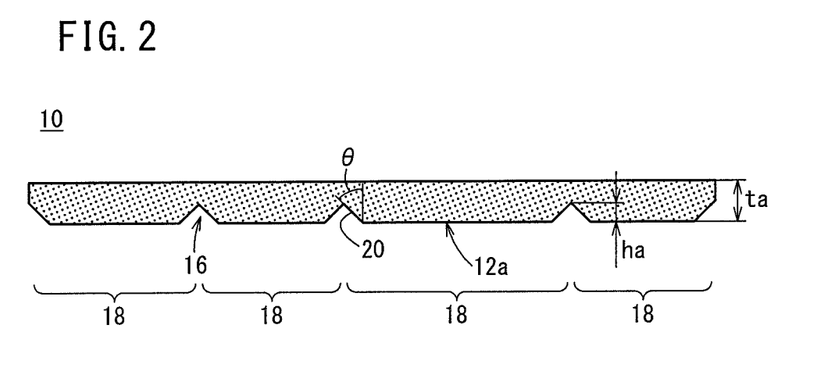
FIG. 2 is a cross-sectional view showing the porous ceramic structure according to the present embodiment.

As shown in FIG. 2, an end surface 20 of the cut 16 may be inclined. All the cuts 16 may have the same inclination angle θ of the end surface 20 or different angles. In this regard, the inclination angle θ refers to an inclination angle to a direction of the normal line that is normal to the one principal surface 12a. The shape of the cut 16 in a cross section may be a rectangle.

As shown in FIG. 2, the relationship between a depth ha of the cut 16 and the thickness ta of the porous ceramic structure 10 is preferably $$1/10 \le ha/ta \le 9/10$$

more preferably, $$1/10 \le ha/ta \le 7/10$$

and even more preferably, $$1/10 \le ha/ta \le 1/2$$

Curved surfaces (surfaces with a radius of curvature R) may or may not be formed on respective ridge line portions of the four side surfaces 14a to 14d.

The term "porous" may refer to a state that is neither dense nor hollow, as well as a state composed of a plurality of pores or grains. Moreover, the term "dense" refers to a state in which a plurality of fine grains are bonded without gaps, having no pores. The term "hollow" refers to a state in which the interior is hollow, and in which an outer shell portion thereof is dense.

The porosity of the porous ceramic structure 10 is 20%~99%. The pores include at least one of closed pores and open pores, and may include both closed pores and open pores. Further, the shape of the pores, i.e., a surface shape of openings thereof, may be of any shape including a square shape, a quadrilateral shape, a triangular shape, a hexagonal shape, a circular shape, etc., or an irregular shape. The average pore diameter preferably is less than or equal to 500 nm, and more preferably, is 10~500 nm. This dimension is effective to inhibit the occurrence of lattice vibrations (phonons), which is a primary cause of thermal conductivity.

The porous ceramic structure 10 has a structure in which fine grains are connected in three dimensions. A grain diameter of the fine grains is preferably 1 nm~5 μm. More preferably, the grain diameter is 50 nm~1 μm. The porous ceramic structure 10, which is composed of fine grains having such a grain size range, effectively achieves a low thermal conductivity, since the occurrence of lattice vibrations (phonons), which is a primary cause of heat conduction, is inhibited. The fine grains may be a grain composed of one crystalline grain (a single crystalline grain), or a grain composed of a large number of crystalline grains (a polycrystalline grain). Stated otherwise, the porous ceramic structure 10 preferably is an aggregation of fine grains having grain diameters lying within the aforementioned ranges. The grain diameter of the fine grains is determined by measuring, from an image of an electronic microscopic observation, the size (a diameter in the case of spherical grains, or a maximum diameter otherwise) of one fine grain of the grain groups that make up a framework of the porous ceramic structure 10.

The thermal conductivity of the porous ceramic structure 10 is preferably less than 1 W/mK, more preferably, is less than or equal to 0.7 W/mK, even more preferably, is less than or equal to 0.5 W/mK, and particularly preferably, is less than or equal to 0.3 W/mK.

The constituent material of the porous ceramic structure 10 preferably contains a metal oxide, and more preferably, consists only of a metal oxide. This is because, if such a metal oxide is contained therein, the thermal conductivity tends to be lower, due to the fact that the ion binding property between metal and oxygen is stronger compared to the case of a non-oxide (for example, a carbide or nitride) of a metal.

In this case, the metal oxide preferably is an oxide of one element or a composite oxide of two or more elements selected from the group consisting of Zr, Y, Al, Si, Ti, Nb, Sr, La, Hf, Ce, Gd, Sm, Mn, Yb, Er, and Ta. This is because, if the metal oxide is an oxide or a composite oxide of such elements, heat conduction due to lattice vibrations (phonons) is unlikely to occur.

Specific examples of the material include $ZrO_2$—$Y_2O_3$ to which $Gd_2O_3$, $Yb_2O_3$, $Er_2O_3$, etc., is added. As further specific examples thereof, there may be cited $ZrO_2$—$HfO_2$—$Y_2O_3$, $ZrO_2$—$Y_2O_3$—$La_2O_3$, $ZrO_2$—$HfO_2$—$Y_2O_3$—$La_2O_3$, $HfO_2$—$Y_2O_3$, $CeO_2$—$Y_2O_3$, $Gd_2Zr_2O_7$, $Sm_2Zr_2O_7$, $LaMnAl_{11}O_{19}$, $YTa_3O_9$, $Y_{0.7}La_{0.3}Ta_3O_9$, $Y_{1.08}Ta_{2.76}Zr_{0.24}O_9$, $Y_2Ti_2O_7$, $LaTa_3O_9$, $Yb_2Si_2O_7$, $Y_2Si_2O_7$, $Ti_3O_5$, and the like.

Next, with reference to FIGS. 3A and 3B, a manufacturing method for manufacturing the porous ceramic structure 10 will be described.

Figure 3A:
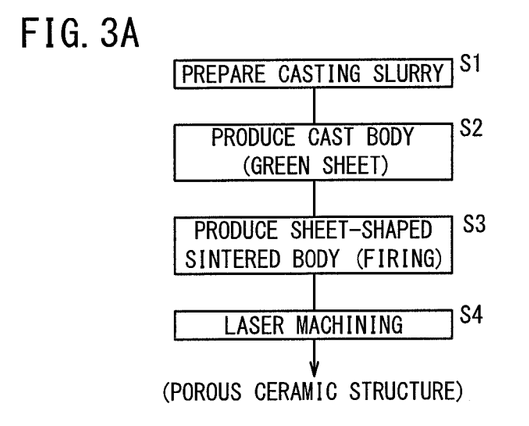
FIG. 3A is a flowchart showing one example of a method for producing the porous ceramic structure.

First, in step S1 of FIG. 3A, a pore forming agent, a binder, a plasticizer, and a solvent are added to and mixed with a constituent material powder of the aforementioned porous ceramic structure 10 in order to prepare a casting slurry.

Thereafter, in step S2, the casting slurry is subjected to a vacuum defoaming treatment, whereby the viscosity of the slurry is adjusted. Thereafter, the cast body (green sheet, green body) is manufactured by, for example, a doctor blade device, such that a thickness thereof after firing becomes the minimum length Lb.

Thereafter, in step S3, the cast body (green sheet) is fired, whereby a sheet-shaped sintered body is obtained.

In addition, in step S4, the sintered body is machined with a laser to thereby obtain the porous ceramic structure 10 having the plurality of cuts 16. Such a laser machining process is performed by causing a laser beam to reach halfway in the thickness direction of the sintered body.

Figure 3B:
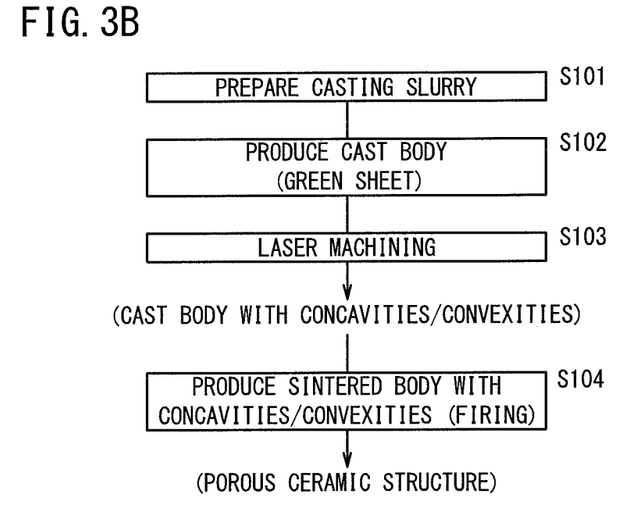
FIG. 3B is a flowchart showing another example of a method for producing the porous ceramic structure.

As another manufacturing method, for example as shown in FIG. 3B, in steps S101 and S102, after having prepared a slurry used for casting in the same manner as in steps S1 and S2 of FIG. 3A, a cast body (green sheet) is produced so that the thickness thereof after firing becomes the minimum length Lb.

Thereafter, in step S103, a cast body (green sheet) having a plurality of concavities and convexities therein is produced by machining the cast body (green sheet) with a laser.

Thereafter, in step S104, the porous ceramic structure 10 having the plurality of cuts 16 therein is obtained by firing the cast body having the plurality of concavities and convexities.

Figure 4B:
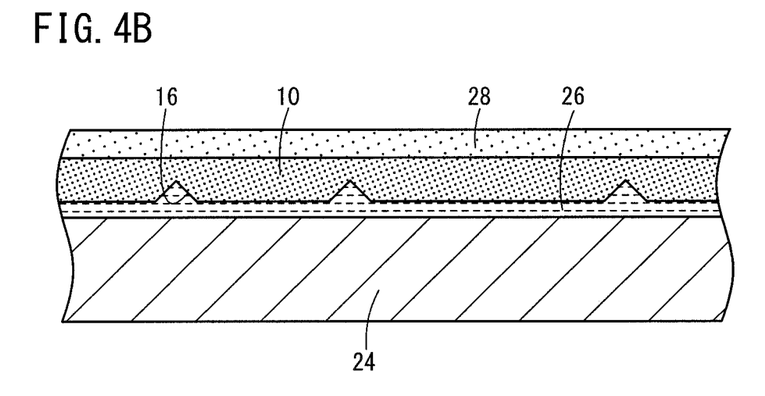
FIG. 4B is a process diagram showing a state in which the porous ceramic structure is transferred onto the adhesive using a sheet having the porous ceramic structure attached to one surface thereof.

Next, a method of constructing a single bulk body 22 using the porous ceramic structure 10 will be described with reference to FIGS. 4A through 4C.

As shown in FIG. 4A, first, an adhesive 26 is coated on the object 24. Then, as shown in FIG. 4B, the porous ceramic structure 10 is transferred onto the adhesive 26 of the object 24, for example, by using a sheet 28 having the porous ceramic structure 10 adhered to one surface thereof. Concerning the sheet 28, a sheet or film having an adhesive force, which becomes peelable due to external factors such as heat, electricity, or the like, is preferable. Of course, if the size of the porous ceramic structure 10 is large enough to be held by a jig, the porous ceramic structure 10 may be placed on the adhesive 26 by using the jig directly, without using the sheet 28.

Figure 4C:
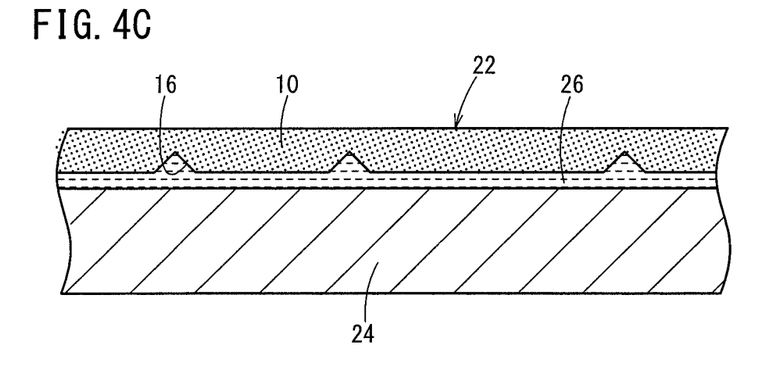
FIG. 4C is a process diagram showing a state in which the sheet is peeled off.

As shown in FIG. 4C, by heating the sheet 28 and peeling off the sheet 28, a bulk body 22 composed of the porous ceramic structure 10 and the adhesive 26 is installed on the object 24.

Figure 5A:
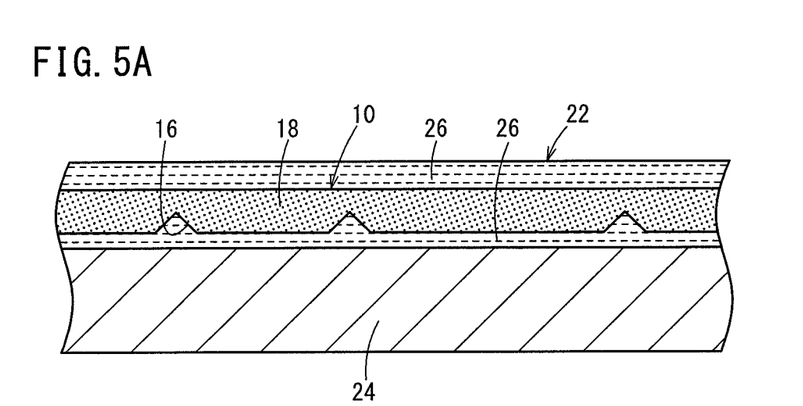
FIG. 5A is a cross-sectional view with partial omission showing an example in which a bulk body is constructed by coating an adhesive on the porous ceramic structure.

Furthermore, as shown in FIG. 5A, the bulk body 22 may further be constituted by coating the adhesive 26 onto the porous ceramic structure 10. In this case, since the outer surface of the porous ceramic structure 10 is covered with the adhesive 26, although the structural integrity thereof increases in strength, there is a concern that the thermal conductivity may become higher than in the example of FIG. 4C.

Figure 5B:
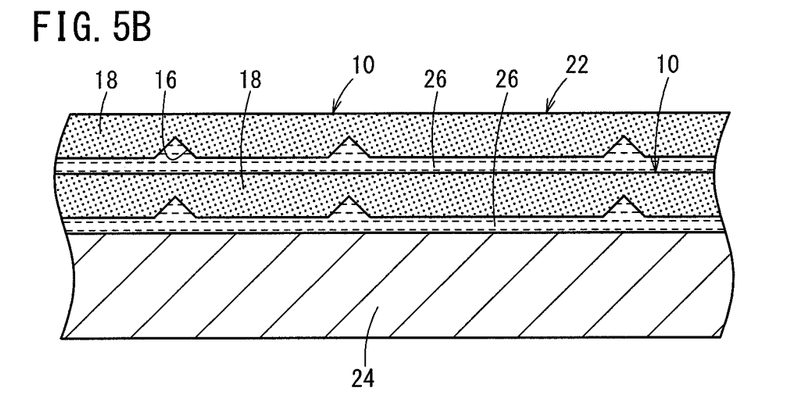
FIG. 5B is a cross-sectional view with partial omission showing an example in which another porous ceramic structure is further transferred onto an upper layer adhesive from the state shown in FIG. 5A to thereby construct the bulk body.
Figure 5C:
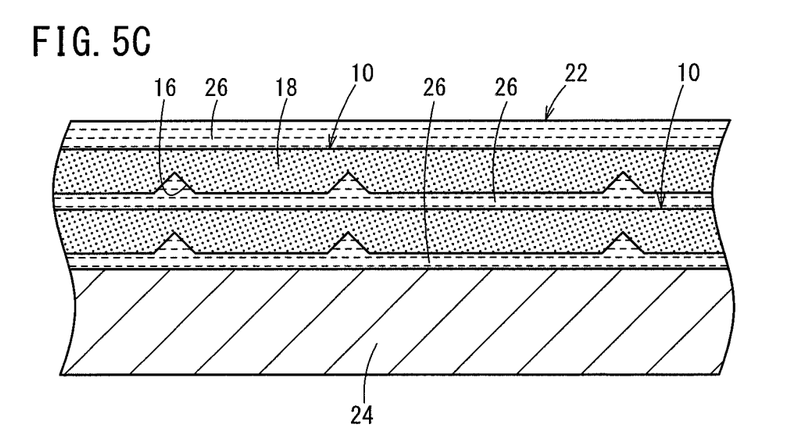
FIG. 5C is a cross-sectional view with partial omission showing an example in which a bulk body is constructed by coating an adhesive onto the porous ceramic structure from the state shown in FIG. 5B.

Further, as shown in FIG. 5B, from the state shown in FIG. 5A, another porous ceramic structure 10 may further be transferred onto the upper layer adhesive 26 to thereby make up the bulk body 22. In other words, the bulk body 22 made up from the adhesive 26 and the porous ceramic structure 10 in two layers is installed. Further, as shown in FIG. 5C, from the state shown in FIG. 5B, the bulk body 22 may further be constituted by coating the adhesive 26 onto the upper layer porous ceramic structure 10.

Of course, starting from the state shown in FIG. 4C, application of the adhesive 26 onto the porous ceramic structure 10→and transfer of another porous ceramic structure 10 onto the adhesive 26 may be repeated plural times, and a bulk body 22 may be constituted from the adhesive 26 and the porous ceramic structure 10 in three or more layers. Alternatively, starting from the state shown in FIG. 5A, transfer of another porous ceramic structure 10 onto the adhesive 26→and application of the adhesive 26 onto the porous ceramic structure 10 may be repeated, and a bulk body 22 may be constituted from the adhesive 26 and the porous ceramic structure 10 in three or more layers.

Figure 6A:
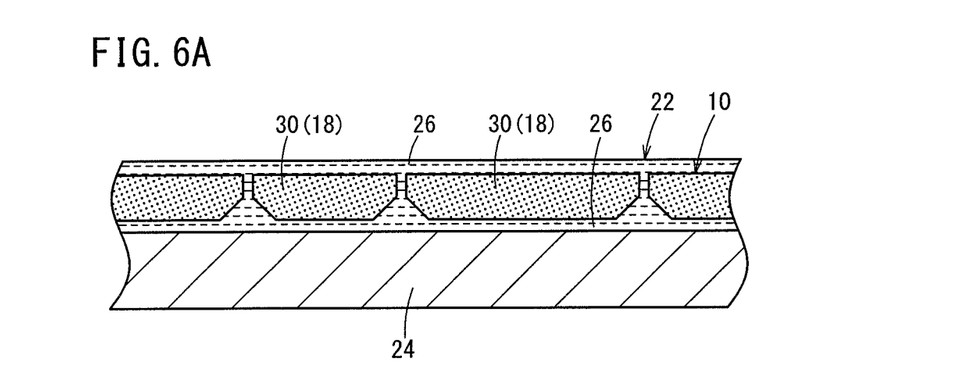
FIG. 6A is a cross-sectional view with partial omission showing a state in which part or all of divided portions of the porous ceramic structure shown in FIG. 5A are separated into divided pieces.
Figure 6B:
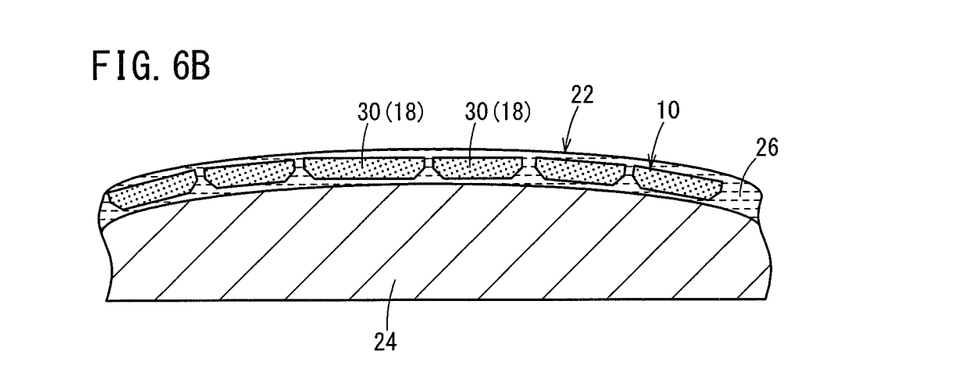

Further, as shown in FIG. 6A, when the porous ceramic structure 10 is transferred onto the adhesive 26, part or all of the divided portions 18 of the porous ceramic structure 10 may be separated into divided pieces 30. In this case, as shown in FIG. 6B, even if a surface of the object 24 has an irregular shape (warped or the like), a curved surface, etc., the plurality of divided pieces 30 can be installed along the surface of the object 24.

Figure 7A:
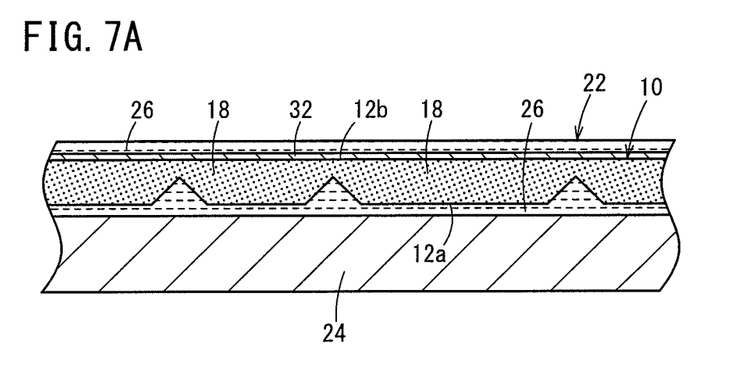
FIG. 7A is a cross-sectional view with partial omission showing a state in which a dense layer is disposed on another principal surface of the porous ceramic structure.
Figure 7B:
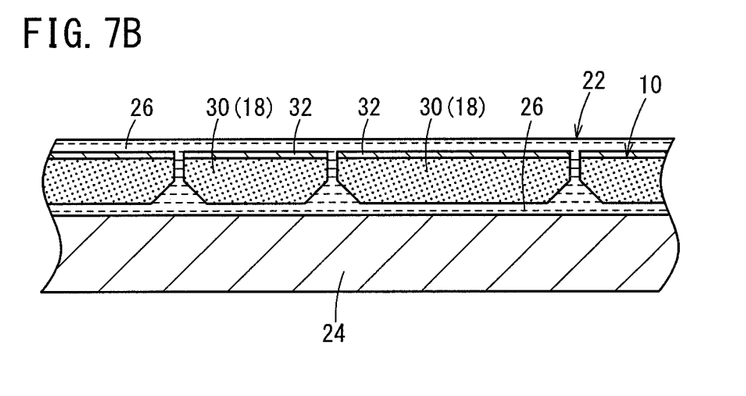
FIG. 7B is a cross-sectional view with partial omission showing a state in which part or all of the divided portions of the porous ceramic structure shown in FIG. 7A are separated into divided pieces.

Further, as shown in FIG. 7A, a dense layer 32 may be disposed on the other principal surface 12b of the porous ceramic structure 10. In this case, as shown in FIG. 7B, even if part or all of the divided portions 18 of the porous ceramic structure 10 are separated into the divided pieces 30, the strength of the respective divided pieces 30 can be ensured by the dense layers 32 which are separated together with the divided pieces 30. Of course, apart from being disposed on the other principal surface 12b of the porous ceramic structure 10, the dense layer 32 may be disposed on the one principal surface 12a (principal surface on the side of the object 24) opposite to the other principal surface 12b. Further, dense layers 32 may be disposed on both the one principal surface 12a and the other principal surface 12b of the porous ceramic structure 10. When the dense layer 32 is disposed on the one principal surface 12a of the porous ceramic structure 10, it is possible to inhibit the adhesive 26 from infiltrating into the porous ceramic structure 10 or the divided pieces 30, and in addition, to increase the strength of the porous ceramic structure 10 or the divided pieces 30. Concerning the arrangement of the dense layer 32 on the porous ceramic structure 10, a separately formed dense layer 32 may be disposed on the porous ceramic structure 10, or an altered layer (dense layer) may be formed in the porous ceramic structure 10 itself.

Figure 8A:
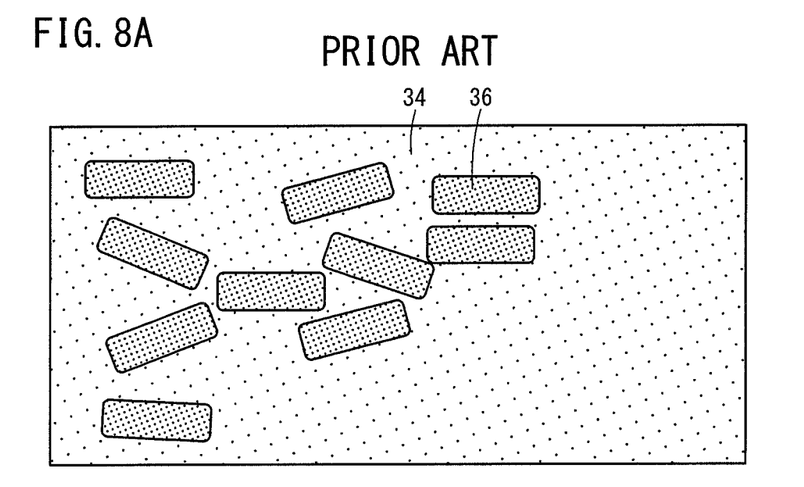
FIG. 8A is an explanatory diagram with partial omission showing a state in which a plurality of particles are dispersed in a slurry according to a conventional example.
Figure 8B:
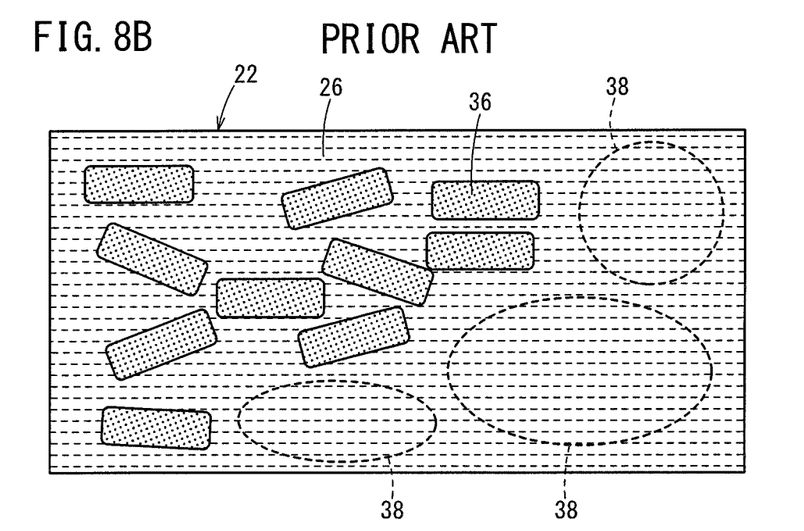
FIG. 8B is an explanatory diagram with partial omission showing a state in which the slurry is dried, fired, and solidified to form a bulk body.

Conventionally, as shown in FIG. 8A, since particles 36 added to a slurry 34 are small, it is difficult to uniformly disperse the particles 36 in the slurry 34. Therefore, as shown in FIG. 8B, since the plurality of particles 36 are not uniformly dispersed in the adhesive 26 when the slurry 34 is fired and solidified into the bulk body 22, many regions 38 exist where only the adhesive 26 is present, which has a thermal conductivity higher than that of the particles 36, and thus, the reduction in thermal conductivity of the bulk body 22 is insufficient.

In contrast, in the present embodiment, for example, as shown in FIG. 5A, since the porous ceramic structure 10 is formed in a state that a plurality of portions divided by the cuts 16, i.e., the plurality of divided portions 18 are put together, the plurality of divided portions 18 can be uniformly distributed and arranged in the adhesive 26. Also, since regions composed of only the adhesive 26 having a higher thermal conductivity than that of the porous ceramic structure 10 become narrowed, the thermal conductivity of the bulk body 22 can be suppressed to remain at a low value. Moreover, the thermal conductivity can be equalized within the bulk bodies 22, there is no need to change or modify the bulk body 22 corresponding to the location where the bulk body 22 is installed, the process of arranging the bulk body 22 can be simplified, and the number of arranging steps can be reduced.

In particular, in the above-mentioned method, since the porous ceramic structure 10 is installed on the object 24 through the adhesive 26, a plurality of the divided portions 18 or a plurality of the divided pieces 30 can be arranged uniformly on the object 24. In addition, it becomes easy to install the bulk body 22 in a partial region of the object 24, or to install the bulk body 22 along a complex shape, the degree of freedom of design can be enhanced. Further, because the sheet 28 is used on which the porous ceramic structure 10 is attached on one surface thereof, handling of the porous ceramic structure 10 in which the plurality of cuts 16 are formed is facilitated, while in addition, the operation of installing the porous ceramic structure 10 onto the adhesive 26 is simplified. This is advantageous in terms of simplifying the manufacturing process.

Preferably, the adhesive strength (JIS Z0237) of the sheet 28 is greater than or equal to 1.0 N/10 mm, the tensile elongation (JIS K7127) of the sheet 28 is greater than or equal to 0.5%, and the thickness of the sheet 28 is less than or equal to 5 mm. Consequently, the following effects can be obtained.

(a) The higher the adhesive strength, the more firmly the porous ceramic structure 10 can be fixed.

(b) As the tensile elongation increases, it is possible to follow the curved surface.

(c) As the thickness thereof is thinner, it becomes easier to follow the curved surface.

In greater detail, the adhesive strength of the sheet 28 exhibits the following properties. More specifically, the adhesive strength at the time that the porous ceramic structure 10 are retained is greater than or equal to 1.0 N/10 mm, and the adhesive strength at the time of peeling the porous ceramic structure 10 is less than or equal to 0.1 N/10 mm.

The method of evaluating the adhesive strength of the sheet 28 is the same as the method used for evaluating the adhesive strength of an adhesive tape. In particular, the sheet 28 is attached to a stainless steel plate, and the sheet 28 is pulled at an angle of 180° or 90°, whereupon the force applied when peeling the sheet 28 off from the stainless steel plate is regarded as the adhesive force (adhesive strength).

Further, the sheet 28 is formed by applying an adhesive to a base material (support). In this case, as the type of base material, preferably a material is selected from among the following.

More specifically, when the porous ceramic structure 10 is transferred onto the planar object 24, it is preferable to use a film, metal foil, paper, or the like as the base material. In this case, since the base material of the sheet 28 is stiff, it is possible to dispose the sheet 28 in the form of a film without wrinkles with respect to the planar object 24.

In the case of transferring the porous ceramic structure 10 onto an object 24 having a curved surface (convex surface, concave surface, irregular surface) shape, it is preferable to use a cloth, a rubber sheet, foam or the like as the base material. In this case, since the base material of the sheet 28 is soft and stretchable, it is possible to dispose the sheet 28 in following relation to the curved surface shape of the object 24.

Further, by application of heat, water, a solvent, light (ultraviolet light), or microwaves, the adhesive strength of the sheet 28 can be weakened and the sheet 28 can be easily peeled off. At this time, the adhesive strength of the sheet 28 is preferably weaker than the adhesive strength of the adhesive 26 that is used between the object 24 and the porous ceramic structure 10.

Further, the cuts 16 are formed in the porous ceramic structure 10. Therefore, for example, as shown in FIG. 5A, when the bulk body 22 is installed on the surface of the object 24, and even if a surface of the object 24 has an irregular shape (warped or the like), a curved surface, etc., the bulk body 22 can be installed along the surface of the object 24.

In the case that the depth ha of the cut 16 is too shallow, the porous ceramic structure 10 is hard to be separated into the plurality of divided pieces 30. Thus, if a surface of the object 24 has an irregular shape (warped or the like), a curved surface, etc., then it is concerned that adhesion of the bulk body 22 to the surface of the object 24 is decreased and the bulk body 22 tends to be peeled off.

Conversely, in the case that the depth ha of the cut 16 is too deep, the porous ceramic structure 10 is easy to be separated. Then, handling (conveyance, etc.) of the porous that the porous ceramic structure 10 is hard to be transferred onto the surface of the object 24 by using the sheet 28. It is also concerned that this leads to complicated steps and reduced productivity.

Accordingly, as mentioned above, the relationship between the depth ha of the cut 16 and the thickness ta of the porous ceramic structure 10 is preferably $1/10 \le ha/ta \le 9/10$. More preferably, the relationship is $1/10 \le ha/ta \le 7/10$, and even more preferably, is $1/10 \le ha/ta \le 1/2$.

EXAMPLES

A confirmation was carried out concerning the adhesion of each of the bulk bodies 22 to the object 24 and the thermal conductivity of each of the bulk bodies 22, for cases in which the respective bulk bodies 22 were constituted using the porous ceramic structures 10 according to Examples 1 through 4 and Comparative Examples 1 and 2.

Example 1

A porous ceramic structure having a porosity of 60%, a minimum length of 50 μm, an aspect ratio of 10, a relationship ha/ta between the depth ha of the cut 16 and the thickness ta of the porous ceramic structure 10 of 1/2 (ha/ta=1/2) was used as a porous ceramic structure 10, and a bulk body 22 according to Example 1 was prepared according to the above-described manufacturing method. More specifically, at first, a sheet 28 having the porous ceramic structure 10 attached to one surface thereof was used. Then, after coating an adhesive 26 (thermal conductivity 2 W/mK) onto an object 24, the porous ceramic structure 10 was transferred onto the adhesive 26 of the object 24 using the sheet 28, and by application of heat thereto, the sheet 28 was peeled off. After coating the transferred structure with an adhesive 26 from above, the adhesive 26 was solidified, and the bulk body 22 was installed on the surface of the object 24.

<Manufacturing of Porous Ceramic Structure>

In Example 1, a porous ceramic structure for use in measuring porosity, and a porous ceramic structure for use as a bulk body were manufactured in the following manner. The porous ceramic structures of the later-described Examples 2 to 4, and Comparative Examples 1 and 2 were also manufactured in a similar manner.

First, a pore forming agent (latex particles or melamine resin particles), a polyvinyl butyral resin (PVB) as a binder, DOP (dioctyl phthalate) as a plasticizer, and xylene and 1-butanol as solvents were added to yttria-partially-stabilized zirconia powder, and mixed in a ball mill for 30 hours in order to prepare a slurry for casting a green sheet. The slurry was subjected to a vacuum defoaming treatment, whereby the viscosity thereof was adjusted to 4000 cps, and thereafter, the cast body (green sheet) was produced by a doctor blade device such that a thickness thereof after firing was of a minimum length. Thereafter, the cast body was fired at 1100° C. for one hour in order to obtain the sintered body. The sintered body was machined by a laser to make cuts, thereby obtaining the porous ceramic structure 10.

Example 2

A porous ceramic structure having a porosity of 60%, a minimum length of 100 μm, an aspect ratio of 5, and ha/ta of 1/2 (ha/ta=1/2) was used as the porous ceramic structure 10, and otherwise, a bulk body 22 according to Example 2 was produced in the same manner as Example 1.

Example 3

A porous ceramic structure having a porosity of 75%, a minimum length of 80 μm, an aspect ratio of 7, and ha/ta of 1/7 (ha/ta=1/7) was used as the porous ceramic structure 10, and otherwise, a bulk body 22 according to Example 3 was produced in the same manner as Example 1.

Example 4

A porous ceramic structure having a porosity of 30%, a minimum length of 100 μm, an aspect ratio of 5, and ha/ta of 1/2 (ha/ta=1/2) was used as the porous ceramic structure 10, and otherwise, a bulk body 22 according to Example 4 was produced in the same manner as Example 1.

Comparative Example 1

A porous ceramic structure having a porosity of 10%, a minimum length of 50 μm, an aspect ratio of 10, and ha/ta of 1/2 (ha/ta=1/2) was used as the porous ceramic structure 10, and otherwise, a bulk body 22 according to Comparative Example 1 was prepared in the same manner as Example 1.

Comparative Example 2

A porous ceramic structure having a porosity of 60%, a minimum length of 50 μm, an aspect ratio of 10, and ha/ta of 1/20 (ha/ta=1/20) was used as the porous ceramic structure 10, and otherwise, a bulk body 22 according to Comparative Example 2 was prepared in the same manner as Example 1.

<Measurement of Porosity>

First, the porous ceramic structure 10 for use in measuring porosity was separated into a plurality of divided pieces 30. Ten divided pieces 30 were selected at random from among the plurality of divided pieces 30 and embedded in a resin. The resin was polished to create an observation site where the divided pieces 30 could be observed with an electron microscope, to thereby obtain a resin-filled polished surface. Then, an electron microscopic observation (image analysis) was performed on the resin-filled polished surface. From such an image analysis, the porosities of the ten divided pieces 30 were calculated, and the average value of the ten divided pieces 30 was taken as the porosity of the porous ceramic structure 10.

<Measurement of Average Pore Diameter>

The average pore diameter of the porous ceramic structure 10 was measured using an automated porosimeter (trade name "Autopore 9200") by Shimadzu Corporation.

<Method of Measuring Thermal Conductivity of Bulk Body and Evaluation Criteria Thereof>

At first, the density of the bulk body 22 was measured with a mercury porosimeter. Next, the specific heat of the bulk body 22 was measured using a DSC (Differential Scanning calorimeter) method. Next, the thermal diffusivity of the bulk body 22 was measured using a laser flash method. Thereafter, the thermal conductivity of the bulk body 22 was calculated from the following relational expression:

Thermal Diffusivity×Specific Heat×Density=Thermal Conductivity

Then, based on the following evaluation criteria, the thermal conductivities of Examples 1 to 4 and Comparative Examples 1 and 2 were evaluated.

A: Less than or equal to 0.9 W/mK
B: Greater than or equal to 1.0 W/mK and less than or equal to 1.4 W/mK
C: Greater than or equal to 1.5 W/mK <Adhesion>

By performing a tape peeling test, the adhesion of the bulk body 22 to the object 24 was evaluated. When any part of the bulk body 22 was peeled off from the object 24, the evaluation "x" was given, and when the bulk body 22 was not peeled off, the evaluation "○" was given. In the case the evaluation "x" was given, the thermal conductivity of the bulk body 22 was not measured.

<Evaluation Results>

A breakdown and evaluation results of Examples 1 to 4, and Comparative Examples 1 and 2 are shown below in Table 1.

TABLE 1

| | Porous Ceramic Structure | | | | Bulk Body | | |
|---|---|---|---|---|---|---|---|
| | Porosity (%) | Minimum Length (μm) | Aspect Ratio | ha/ta | Peeling Test | Thermal Conductivity (W/mK) | Evaluation |
| Example 1 | 60 | 50 | 10 | 1/2 | ○ | 0.8 | A |
| Example 2 | 60 | 100 | 5 | 1/2 | ○ | 0.4 | A |
| Example 3 | 75 | 80 | 7 | 1/7 | ○ | 0.3 | A |
| Example 4 | 30 | 100 | 5 | 1/2 | ○ | 1.0 | B |
| Comparative Example 1 | 10 | 50 | 10 | 1/2 | ○ | 1.8 | C |
| Comparative Example 2 | 60 | 50 | 10 | 1/20 | X | — | — |

As can be understood from Table 1, in Comparative Example 2, the bulk body 22 was peeled off in the tape peeling test. It is considered that the adhesion was reduced because the depth ha of the cut 16 was too shallow and the bulk body 22 could not follow the surface shape of the object 24. Thus, concerning Comparative Example 2, the thermal conductivity of the bulk body 22 was not measured or evaluated.

The thermal conductivity of Comparative Example 1 was high at 1.8 W/mK. It is considered that the thermal conductivity was high because in the bulk body 22 according to Comparative Example 1, many regions existed in which only the adhesive 26 was present.

Meanwhile, among Examples 1 to 4, with the exception of Example 4, the thermal conductivities of the bulk bodies 22 were all less than or equal to 0.9 W/mK, and the evaluation therefor was A. Concerning Example 4 as well, although the evaluation was B, the thermal conductivity was 1.0 W/mK, which was exceedingly close to the evaluation result of A.

This is considered to be due to the fact that, in Examples 1 to 4, as compared with Comparative Examples 1 and 2, since the plurality of divided portions 18 or the plurality of divided pieces 30 were uniformly dispersed in the adhesive 26, and the regions composed of only the adhesive 26 having a high thermal conductivity were narrowed, the thermal conductivity of the bulk body 22 could be suppressed to remain at a low value.

The porous ceramic structure according to the present invention is not limited to the above-described embodiments, and it is a matter of course that various configurations could be adopted therein without departing from the gist of the present invention.

What is claimed is:

1. A porous ceramic structure having a porosity of 20% to 99%, comprising one principal surface, and another principal surface opposite to the one principal surface, wherein at least one cut is formed from the one principal surface toward the other principal surface, wherein a depth of the cut is less than a thickness of the porous ceramic structure, and an aspect ratio of a portion divided by the cut is greater than or equal to 3, wherein a thermal conductivity of the porous ceramic structure is less than or equal to 1 W/mK, and wherein the porous ceramic structure has a structure in which fine grains are connected in three dimensions, and a grain diameter of the fine grains is 1 nm to 5 μm.

2. The porous ceramic structure according to claim 1, wherein a relationship 1/10≤ha/ta≤9/10 is satisfied where ha is a depth of the cut and to is a thickness of the porous ceramic structure.

3. The porous ceramic structure according to claim 1, wherein a minimum length of the porous ceramic structure is less than or equal to 500 μm.

4. The porous ceramic structure according to claim 1, wherein an average pore diameter of the porous ceramic structure is less than or equal to 500 nm.

5. The porous ceramic structure according to claim 1, wherein the porous ceramic structure is disposed on a sheet.

* * * * *